United States Patent
Yildirim et al.

(10) Patent No.: US 10,793,132 B2
(45) Date of Patent: Oct. 6, 2020

(54) VEHICLE MOTION DETECTING APPARATUS

(71) Applicant: Robert Bosch GmbH, Stuttgart (DE)

(72) Inventors: Fevzi Yildirim, Kanagawa (JP); Katrin Jost, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 16/061,274

(22) PCT Filed: Dec. 11, 2015

(86) PCT No.: PCT/EP2015/079405
§ 371 (c)(1),
(2) Date: Jun. 11, 2018

(87) PCT Pub. No.: WO2017/097374
PCT Pub. Date: Jun. 15, 2017

(65) Prior Publication Data
US 2018/0362010 A1 Dec. 20, 2018

(51) Int. Cl.
*B60T 17/22* (2006.01)
*B60Q 9/00* (2006.01)
(Continued)

(52) U.S. Cl.
CPC ............ *B60T 17/22* (2013.01); *B60Q 9/00* (2013.01); *B60T 8/1706* (2013.01);
(Continued)

(58) Field of Classification Search
CPC ... B60T 7/22; B60T 8/00; B60T 8/177; B60T 8/1706; B60T 8/17551; B60T 8/885;
(Continued)

(56) References Cited

U.S. PATENT DOCUMENTS 6,647,352 B1 11/2003 Horton
7,729,829 B2 * 6/2010 Messih .............. B60R 21/0132
180/282
(Continued)

FOREIGN PATENT DOCUMENTS

JP 2002022766 1/2002
JP 2004058960 A 2/2004
(Continued)

OTHER PUBLICATIONS

International Search Report for Application No. PCT/EP2015/079405 dated Aug. 17, 2016 (3 pages).

*Primary Examiner* — Yonel Beaulieu
(74) *Attorney, Agent, or Firm* — Michael Best & Friedrich LLP

(57) ABSTRACT

The present invention provides a vehicle motion detecting apparatus that can satisfy a required detection accuracy with a simple architecture and at a low cost, and also maintain reliability of an applied external apparatus. The vehicle motion detecting apparatus 100 of the present invention has a motion detecting section 10 that detects a motion of a vehicle and a malfunction detecting section 20 that detects a malfunction of the motion detecting section 10, and is characterized in that the motion detecting section 10 is a 6-axis inertial sensor as the first multi-axis inertial sensor that is capable of detecting accelerations in directions of three axes and angular velocities about three axes.

9 Claims, 1 Drawing Sheet

(51) Int. Cl.
  *B60T 8/00* (2006.01)
  *B62J 99/00* (2020.01)
  *G01P 21/00* (2006.01)
  *G07C 5/00* (2006.01)
  *G01C 5/02* (2006.01)
  *G01C 21/00* (2006.01)
  *B60W 50/00* (2006.01)
  *B60W 50/06* (2006.01)
  *B60T 8/17* (2006.01)
  *B60T 8/88* (2006.01)
  *B60T 8/1755* (2006.01)
  *G07C 5/02* (2006.01)
  *B62J 45/40* (2020.01)

(52) U.S. Cl.
  CPC .......... *B60T 8/17551* (2013.01); *B60T 8/885* (2013.01); *B62J 99/00* (2013.01); *G01P 21/00* (2013.01); *G07C 5/02* (2013.01); *B60T 2250/06* (2013.01); *B60T 2270/413* (2013.01); *B62J 45/40* (2020.02)

(58) Field of Classification Search
  CPC . B60T 2250/06; B60T 2270/413; B62J 99/00; B62J 45/40; B62J 6/015; B62J 50/20; G07C 5/00; G07C 5/02; G01C 22/002; G01C 23/00; B60W 50/00; B60W 50/06; G01P 21/00; G01P 21/02; B60R 21/0132; B60Q 9/00
  See application file for complete search history.

(56) References Cited

U.S. PATENT DOCUMENTS

| | | | |
|---|---|---|---|
| 8,306,697 B2* | 11/2012 | Lu | B60T 8/171 |
| | | | 701/38 |
| 2004/0189722 A1* | 9/2004 | Acres | G01C 23/00 |
| | | | 715/866 |
| 2005/0080542 A1* | 4/2005 | Lu | B60W 50/06 |
| | | | 701/70 |
| 2005/0242991 A1* | 11/2005 | Montgomery | G01S 19/15 |
| | | | 342/357.36 |
| 2010/0292915 A1 | 11/2010 | Ishigami et al. | |
| 2011/0187546 A1* | 8/2011 | Liberman | B60R 21/0132 |
| | | | 340/669 |
| 2013/0125651 A1* | 5/2013 | Morningstar | G01P 21/00 |
| | | | 73/514.16 |

FOREIGN PATENT DOCUMENTS

| | | |
|---|---|---|
| JP | 2008247053 A | 10/2008 |
| JP | 2010012903 A | 1/2010 |
| WO | 0201151 | 1/2002 |
| WO | 2006026751 | 3/2006 |

* cited by examiner

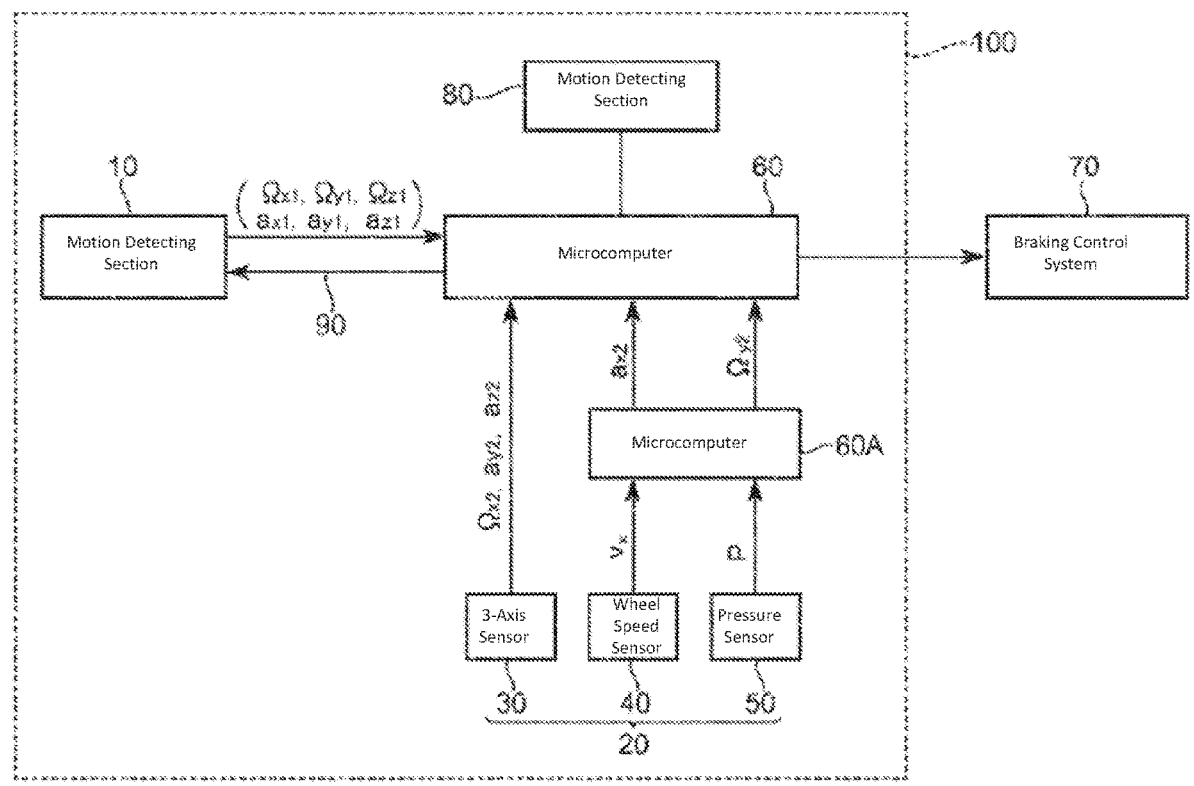

VEHICLE MOTION DETECTING APPARATUS

TECHNICAL FIELD

The present invention relates to a vehicle motion detecting apparatus, and particularly relates to a vehicle motion detecting apparatus used for a braking control system of a two-wheeled vehicle.

BACKGROUND

Some conventional vehicle braking control systems are fitted with a 3-axis inertial sensor, and this 3-axis inertial sensor includes, for example, two acceleration sensors and one rotation sensor. This 3-axis inertial sensor detects accelerations and angular velocities, and detects, for example, a longitudinal (front-back) direction acceleration, a lateral acceleration and a yaw rate, respectively. This conventional braking control system detects the state of the vehicle from detection values of the accelerations and the angular velocity that are respectively obtained by this 3-axis inertial sensor or detection values of other sensors, and generally carries out stability control of the vehicle using the detection results.

As for inertial sensors, a sensor of a type that uses a mass supported by a plurality of springs, respectively, and detects accelerations and angular velocities based on a displacement of the mass, and a sensor of a type in which comb-like capacitors are formed on sides of a mass and a change in electrostatic capacitance is converted into an electric signal corresponding to an acceleration or an angular velocity by an electronic circuit are widely used. However, there may be a case where sensors having such structures become unable to detect the state of the vehicle accurately due to causes such as the mass being stuck, and the braking control system cannot perform stabilization control.

For example, patent document 1 discloses a failure determining apparatus for an inertial sensor that can determine, in a posture control apparatus of an automobile, without providing any special detecting means, a malfunction in a 3-axis inertial sensor having a longitudinal acceleration sensor, a lateral acceleration sensor and a rotation sensor by a device at the side where the sensor output is used, the sensor output being used such that accelerations or an angular velocity for three axes are estimated based on vehicle speed information, wheel rotation information for each wheel (rotation difference information) and steering angle information, and these estimated values are compared with detected values obtained by the 3-axis inertial sensor.

The failure determining apparatus for an inertial sensor disclosed in patent document 1 detect, in an automobile, a status of a vehicle with three types of sensors, i.e., a longitudinal direction acceleration sensor, a lateral acceleration sensor and a yaw rate sensor, and determines, on a control unit side, whether there is a failure in the three types of sensors.

Inertial sensors for vehicles require a high reliability since a vehicle, particularly a two-wheeled vehicle, may run with its car body greatly inclined to turn around a curve, or may be used for running on a rough road, and may be used under a condition where there is a considerable impact on the car body. Accordingly, a conventional inertial sensor for a vehicle requires a high reliability against an external force, and, for example, a detection accuracy does not decrease even if subjected to an external force for a long period of time and a detection performance is also maintained even if a great external force is applied. In order to meet these requirements, conventional inertial sensors for vehicles needs to satisfy a high reliability against an external force and thus are expensive.

A two-wheel vehicle runs, for example, with its car body inclined inwards when turning around a curve and it is more likely that the car body comes to an unstable condition as compared to a four-wheeled vehicle. Therefore, motion stability braking control of a vehicle cannot be performed sufficiently by merely detecting two acceleration and one angular velocity, i.e., a longitudinal acceleration, a lateral acceleration and a yaw rate with the aforementioned 3-axis inertial sensor. Accordingly, it is preferable to more accurately control a vehicle condition by detecting accelerations for two or three axes and angular velocities for three or two axes further including two or three of a roll rate, a pitch rate and a vertical direction acceleration.

Document List

Patent Document(s)

Patent Document 1: Japanese Laid-Open Patent Publication No. 2002-22766

SUMMARY OF INVENTION

Technical Problem

However, when controlling the vehicle condition by detecting the accelerations or angular velocities for five or six axes as described above, it has been required that the vehicle be equipped with five or six very expensive inertial sensors for vehicles. Accordingly, there was also a problem that a vehicle motion detecting apparatus also becomes expensive.

On the other hand, commercially available consumer 5-axis or 6-axis inertial sensors, which are not the aforementioned inertial sensors for vehicles, are widely used in products such as, for example, in-vehicle navigation systems and telematics systems, in which a great external force applied thereto is not expected. Although such consumer 5-axis or 6-axis inertial sensors are available at low cost, they are not subjected to validation tests of severe environmental conditions for use in braking control systems for stabilizing a vehicle motion. Thus, when, for example, a great external force is applied depending on an operation condition of the vehicle or a condition of the road surface, there may be a case where a failure occurs or erroneous sensor signals are transmitted. Therefore, in a case where such consumer 5-axis or 6-axis inertial sensors are used as sensors for braking control systems for stabilizing the vehicle motion, it was difficult to guarantee reliability of the braking control system.

Further, a conventional vehicle motion stabilizing braking control apparatus is known that uses detection values of a fewer inertial sensors to calculate the remaining inertial value/inertial values by calculation. However, calculated inertial values of accelerations and angular velocities are not as accurate as inertial values that are directly detected by the inertial sensors, and there was a problem of a reduced control accuracy in this type of a vehicle motion stabilizing braking control system.

It is an object of the present invention to provide a vehicle motion detecting apparatus that can meet a required detection accuracy with a simple structure and at low cost, and also maintain reliability of an applied external apparatus.

Solution to Problem

In order to achieve the aforementioned object, the subject matters of the present invention are as follows.

(1) A vehicle motion detecting apparatus comprising:
a motion detecting section that detects a motion of a vehicle; and
a malfunction detecting section for detecting a malfunction of the motion detecting section,
characterized in that the motion detection section includes a first multi-axis inertial sensor that is capable of detecting in three mutually orthogonal axes, accelerations in directions of the three axes and angular velocities about at least two of the three axes, respectively, and
the malfunction detecting section includes a plurality of other sensors and a computing section, wherein the computing section performs a comparison operation between a detection value of the first multi-axis inertial sensor that is electrically connected to the computing section and a detection value of the plurality of other sensors, and discriminates a malfunction of the first multi-axis inertial sensor from a comparison operation value obtained by the comparison operation.

(2) The vehicle motion detecting apparatus according to the aforementioned (1), characterized in that plurality of other sensors includes a second multi-axis inertial sensor that is capable of detecting at least an acceleration in a front-back direction, an acceleration in a lateral direction and a roll rate of the vehicle, a wheel speed sensor, and a pressure sensor.

(3) The vehicle motion detecting apparatus according to the aforementioned (2), characterized in that the detection value of the plurality of other sensors with which the malfunction detecting section performs the comparison operation with the detection value of the first multi-axis acceleration sensor is a detection value obtained by at least one of the second multi-axis inertial sensor, the wheel speed sensor and the pressure sensor.

(4) The vehicle motion detecting apparatus according to the aforementioned (2) or (3), characterized in that the pressure sensor is a brake fluid pressure sensor that is capable of sensing a brake fluid pressure of the vehicle, the brake fluid pressure sensor being provided in a braking control system for which the vehicle motion detecting apparatus is used.

(5) The vehicle motion detecting apparatus according to the aforementioned (4), characterized in that, in a case where the malfunction detecting section has judged that there is a malfunction, the braking control system is forcibly stopped.

(6) The vehicle motion detecting apparatus according to any one of the aforementioned (2) to (5), characterized in that the vehicle is a two-wheeled vehicle, and the wheel speed sensor is capable of detecting at least one of the wheel speeds of the two-wheeled vehicle.

(7) The vehicle motion detecting apparatus according to any one of the aforementioned (1) to (6), characterized by further comprising an alerting device that informs a driver of a discrimination result of the malfunction detecting section.

(8) The vehicle motion detecting apparatus according to any one of the aforementioned (1) to (7), characterized by further comprising a sensor correcting device that corrects an output value of the first multi-axis inertial sensor depending on a discrimination result of the malfunction detecting section.

(9) The vehicle motion detecting apparatus according to any one of the aforementioned (1) to (8), characterized in that, in a case where the malfunction detecting section has judged that there is a malfunction, the motion detecting section does not send out at least one detection value of the first multi-axis inertial sensor.

Advantageous Effects of Invention

According to the present invention, in a first multi-axis inertial sensor, a detection accuracy of an acceleration and an angular velocity can be improved since accelerations in directions of three axes and angular velocities about at least two of the three axes are detected with at least five inertial sensors, respectively, and each of the accelerations and angular velocities is directly detected by the inertial sensors, respectively. Further, since a malfunction of the first multi-axis inertial sensor is detected in a malfunction detecting section, in a case where a malfunction is detected, a detection value of the inertial sensor can be avoided from being used externally. Accordingly, even if a low-cost consumer inertial sensor, which is not expected to receive a large external force when in use, is employed as a first multi-axis inertial sensor, in a case where a malfunction of the inertial sensor due to a large external force acting on the inertial sensor is detected, this detection value of the inertial sensor will not be used externally. In this manner, it is possible to prevent an external apparatus, which employs a motion detecting apparatus, from operating in accordance with a detection value of an inertial sensor having a malfunction. Therefore, a vehicle motion detecting apparatus according to the present invention can achieve maintaining of reliability of an external apparatus with a simple architecture and at a low cost.

Specifically, in a case where the vehicle motion detecting apparatus of the present invention is used for a braking control system of a vehicle, even if consumer low-cost inertial sensors used in, for example, in-vehicle navigation systems and telematics systems are used as the first multi-axis inertial sensor of the present invention, it is possible to prevent a braking control system of a vehicle from operating based on a detection value of an inertial sensor having a malfunction, and reliability of the braking control system of a vehicle can be maintained.

In this manner, according to the vehicle motion detecting apparatus of the present invention, required detection accuracy can be satisfied with a simple architecture and at a low cost, and also reliability of an applied external apparatus can be maintained.

BRIEF DESCRIPTION OF DRAWINGS

FIG. 1 is a block diagram schematically showing a configuration of a vehicle motion detecting apparatus according to an embodiment of the present invention.

DESCRIPTION OF THE PREFERRED EMBODIMENTS

An embodiment of the present invention will now be described with reference to FIG. 1. Components and arrangements described below should not be considered as limiting the present invention, and may be altered and modified within the scope of the present invention.

A vehicle motion detecting apparatus 100 shown in FIG. 1 is used for a braking control system 70 of a vehicle, particularly a two-wheel vehicle, and includes a motion detecting section 10 that detects a motion of the vehicle and a malfunction detecting section 20 for detecting a malfunction of the motion detecting section 10. Note that, in FIG. 1, the vehicle motion detecting apparatus 100 is indicated by a region surrounded by a dotted line.

The motion detecting section 10 includes a first multi-axis inertial sensor 11 that is capable of detecting, for three axes that are mutually orthogonal, accelerations in directions of the three axes and angular velocities about at least two axes among these three axes, respectively. Defining a longitudinal (front-back) direction of the vehicle as an x-axis direction, a lateral (right-left) direction as a y-axis direction, and a vertical (up-down) direction as a z-axis direction, the first multi-axis inertial sensor 11 is a 6-axis inertial sensor serving as a multi-axis inertial sensor that is capable of detecting accelerations $a_{x1}$, $a_{y1}$, $a_{z1}$ for three axes and angular velocities $\Omega_{x1}$, $\Omega_{y1}$, $\Omega_{z1}$ about three axes, the accelerations for three axes and the angular velocities about three axes consisting of accelerations in three-axis directions of an x-axis direction acceleration $a_{x1}$, a y-axis direction acceleration $a_{y1}$ and a z-axis direction acceleration $a_{z1}$, as well as angular velocities about three axes of an angular velocity about an x-axis (roll rate) $\Omega x$, an angular velocity about a y-axis (pitch rate) $\Omega y$, and an angular velocity about a z-axis (yaw rate) $\Omega z$. The first multi-axis inertial sensor 11 as a 6-axis inertial sensor includes three acceleration sensors and three angular velocity sensors, and each of the six sensors detects the accelerations for the three axes $a_{x1}$, $a_{y1}$, $a_{z1}$ and the angular velocities about the three axes $\Omega_{x1}$, $\Omega_{y1}$, $\Omega_{z1}$, respectively. The first multi-axis inertial sensor 11 is, in order to particularly reduce equipment cost, preferably a low-cost consumer 6-axis inertial sensor provided with three acceleration sensors and three angular velocity sensors, which is used in, for example, vehicle navigation systems and telematics systems.

The malfunction detecting section 20 includes a plurality of sensors (other sensors). It is preferable that the malfunction detecting section 20 includes a 3-axis inertial sensor (second multi-axis inertial sensor) 30 that is capable of detecting the angular velocity about the x-axis $\Omega_{x2}$, the y-axis direction acceleration $a_{y2}$ and the z-axis direction acceleration $a_{z2}$, among the accelerations for three axes $a_{x2}$, $a_{y2}$, $a_{z2}$, and angular velocities about three axes $\Omega_{x2}$, $\Omega_{y2}$, $\Omega_{x2}$, a wheel speed sensor 40 and a pressure sensor 50.

Also, it is preferable that the malfunction detecting section 20 includes a microcomputer as a computing section that is electrically connected to the malfunction detecting section 20 internally or externally as shown FIG. 1. As this computing section, in FIG. 1, it is preferable that two microcomputers 60 and 60A are provided, and it is preferable that the microcomputer 60 is provided with an algorithm for receiving and performing a comparison operation between the detection values $a_{x1}$, $a_{y1}$, $a_{z1}$, $\Omega_{x1}$, $\Omega_{y1}$, $\Omega_{z1}$ of the accelerations and angular velocities for the six axes obtained by the first multi-axis inertial sensor 11, and the detection values $a_{x2}$, $a_{y2}$, $a_{x2}$, $\Omega_{x2}$, $\Omega_{y2}$, $\Omega_{x2}$ obtained by the malfunction detecting section 20.

For example, in an embodiment shown in FIG. 1, the malfunction detecting section 20 includes the 3-axis inertial sensor 30 that are preferably used for motion stability braking control of the vehicle, the wheel speed sensor 40 and the pressure sensor 50. The 3-axis inertial sensor 30 directly detects accelerations for two axes and an angular velocity about one axis of the angular velocity $\Omega_{x2}$ about the x-axis, the y-axis direction acceleration $a_{y2}$ and the z-axis direction acceleration $a_{z2}$. The wheel speed sensor 40 measures wheel speeds $v_x$ of at least two wheels, and the x-axis direction acceleration $a_{x2}$ is detected by differentiating the measured wheel speeds $v_x$ with respect to time in the second CPU 60A, which is a microcomputer. And, the pressure sensor 50, which is preferably a brake fluid pressure sensor 50 which is a component of the braking control system 70, can estimate the angular velocity $\Omega_{y2}$ about the y-axis of the car body by comparing measured fluid pressures P of front and rear wheels. The first CPU 60 receives and performs a comparison operation between the angular velocity $\Omega_{x2}$ about x-axis, the y-axis direction acceleration $a_{y2}$, and the z-axis direction acceleration $a_{z2}$ detected by the 3-axis acceleration sensor 30, the x-axis direction acceleration $a_{x2}$ detected by the wheel speed sensor 40, and the angular velocity $\Omega_{y2}$ about the y-axis estimated by the brake fluid pressure sensor 50 and the detected values $a_{x1}$, $a_{y1}$, $a_{x1}$, $\Omega_{x1}$, $\Omega_{y1}$, $\Omega_{z1}$ of each of the accelerations and angular velocities obtained by the first multi-axis inertial sensor 11 of the motion detecting section 10, to thereby discriminate a malfunction of the first multi-axis inertial sensor 11.

In FIG. 1, illustrated is the embodiment in which, in order to increase malfunction detection accuracy, the detected values obtained in the malfunction detecting section 20 are subject to the comparison operation with all of the detected values obtained with the 3-axis inertial sensor 30, the wheel speed sensor 40 and the pressure sensor 50. However, according to the present invention, the configuration may be altered to a configuration in which a comparison operation is performed using a detected value obtained by at least one of the 3-axis inertial sensor 30, the wheel speed sensor 40 and the pressure sensor 50.

Accordingly, in a case where the result of the comparison operation in the first CPU 60 shows a predetermined mismatch between the detected values which are from the motion detecting section 10 and the malfunction detecting section 20 and corresponding with each other, the first CPU 60 determines that the detected values of the accelerations and the angular velocities detected by the first multi-axis inertial sensor 11 that is a 6-axis inertial sensor are abnormal. In this case, a command is submitted from the first CPU 60 to the braking control system 70 to operate in a fail-safe mode.

In a case where it is determined by the first CPU that at least one of the detection values of the accelerations and angular velocities detected by the first multi-axis inertial sensor 11 is abnormal, the detection values of the accelerations and the angular velocities detected by the first multi-axis inertial sensor 11 are not sent to the braking control system 70. In this case, all detection values of the first multi-axis inertial sensor 11 are not sent to the braking control system 70, or at least one detection value that has indicated a malfunction of the first multi-axis inertial sensor 11 are not sent to the braking control system 70. Also, in this case, the braking control system 70 may stop the braking control and inform the driver of the stoppage of the braking control. Thus, it is possible to avoid a braking control by the braking control system 70 based on a false detection result of the motion of the two-wheeled vehicle, and it is also possible to prevent the braking control system 70 from impairing safety and reliability.

Note that, FIG. 1 shows a configuration including two microcomputers, i.e., the first CPU 60 and the second CPU 60A, but the configuration may include only one microcomputer, i.e., the first CPU 60.

As another embodiment, the 3-axis inertial sensor may be a so-called 3-axis gyroscope sensor (3-axis angular velocity sensor) that detects the angular velocities about three axes, i.e., the angular velocity about the x-axis (roll rate) $\Omega_{x1}$, the angular velocity about the y-axis (pitch rate) $\Omega_{y1}$ and the angular velocity about the z-axis (yaw rate) $\Omega_{z1}$.

Further, the first multi-axis inertial sensor 11 may have five-axis inertial sensors that respectively detect accelerations for three axes and angular velocities about two axes including accelerations in three directions, i.e., an x-axis direction acceleration $a_{x1}$, a y-axis direction acceleration $a_{y1}$ and a z-axis direction acceleration $a_{z1}$, as well as angular velocities about two of three axes, i.e., an angular velocity about an x-axis (roll rate) $\Omega x$, an angular velocity about a y-axis (pitch rate) $\Omega y$, and an angular velocity about a z-axis (yaw rate) $\Omega z$.

The pressure sensor 50 of the malfunction detecting section 20 is, from the viewpoint of reducing equipment cost or the like, preferably a brake fluid pressure sensor of the braking control system. Further, in order to inform the driver of the detection of a malfunction of the first multi-axis inertial sensor 11, it is preferable that the malfunction detecting section 20 is further provided with, for example, an alerting means 80 such as an alarm display and an alarm tone.

INDUSTRIAL APPLICABILITY

According to the present invention, it is possible to provide a vehicle motion detecting apparatus which is used for a braking control system of a vehicle, particularly a two-wheeled vehicle, that can detect a malfunction of the multi-axis inertial sensor with a simple structure and at low cost by employing a consumer low-cost 6-axis inertial sensors used in, for example, vehicle navigation systems and telematics systems as a multi-axis sensor used for a braking control system of a vehicle and by employing the malfunction detecting section detecting a malfunction of the 6-axis inertial sensor.

List of Reference Signs 10 motion detecting section
11 first multi-axis inertial sensor
20 malfunction detecting section
30 3-axis acceleration sensor
40 wheel speed sensor
50 pressure sensor (or brake fluid pressure sensor)
60 microcomputer (or first CPU)
60A microcomputer (or second CPU)
70 braking control system (or ABS ECU)
80 alerting means
90 output signal
100 vehicle motion detecting apparatus

The invention claimed is:

1. A vehicle motion detecting apparatus comprising:
a motion detecting section that detects a motion of a vehicle; and
a malfunction detecting section for detecting a malfunction of the motion detecting section and that includes a first multi-axis inertial sensor configured to detect, for three axes that are mutually orthogonal, accelerations in directions of the three axes and angular velocities about at least two of the three axes, respectively, and
wherein the malfunction detecting section includes a plurality of other sensors and a computing section that is electrically connected to the first multi-axis inertial sensor, wherein the computing section
performs a comparison operation between a detection value of the first multi-axis inertial sensor and a detection value of the plurality of other sensors, and
determines a malfunction of the first multi-axis inertial sensor based on a comparison value obtained by the comparison operation.

2. The vehicle motion detecting apparatus according to claim 1, wherein the plurality of other sensors includes:
a second multi-axis inertial sensor that is capable of detecting at least an acceleration in a front-back direction, an acceleration in a lateral direction, and a roll rate of a vehicle;
a wheel speed sensor; and
a pressure sensor.

3. The vehicle motion detecting apparatus according to claim 2, wherein the detection value of the plurality of other sensors with which the malfunction detecting section performs the comparison operation with the detection value of the first multi-axis acceleration sensor is a detection value obtained by at least one of the group consisting of the second multi-axis inertial sensor, the wheel speed sensor and the pressure sensor.

4. The vehicle motion detecting apparatus according to claim 2, wherein the pressure sensor is a brake fluid pressure sensor that is capable of sensing a brake fluid pressure of the vehicle, the brake fluid pressure sensor being provided in a braking control system for which the vehicle motion detecting apparatus is used.

5. The vehicle motion detecting apparatus according to claim 4, wherein, in a case where the malfunction detecting section has judged that there is a malfunction, the braking control system is forcibly stopped.

6. The vehicle motion detecting apparatus according to claim 2, wherein the vehicle is a two-wheeled vehicle, and the wheel speed sensor is capable of detecting at least one of the wheel speeds of the two-wheeled vehicle.

7. The vehicle motion detecting apparatus according to claim 1, further comprising an alerting device that informs a driver of a determination result of the malfunction detecting section.

8. A sensor correcting means that corrects an output value of the first multi-axis inertial sensor depending on a discrimination result of the malfunction detecting section.

9. The vehicle motion detecting apparatus according to claim 1, wherein, when the malfunction detecting section determines that there is a malfunction, the motion detecting section does not send out at least one detection value of the first multi-axis inertial sensor.

* * * * *